United States Patent
Kinnunen

(10) Patent No.: US 10,994,765 B2
(45) Date of Patent: May 4, 2021

(54) TRANSFER APPARATUS FOR A SNOWMOBILE

(71) Applicant: Race addicts, Kajaani (FI)

(72) Inventor: Pekka Kinnunen, Kajaani (FI)

(73) Assignee: Race Addicts, Kajaani (FI)

( * ) Notice: Subject to any disclaimer, the term of this patent is extended or adjusted under 35 U.S.C. 154(b) by 0 days.

(21) Appl. No.: 16/414,796

(22) Filed: May 17, 2019

(65) Prior Publication Data

US 2019/0351930 A1  Nov. 21, 2019

(30) Foreign Application Priority Data

May 17, 2018  (FI) ...................................... 20185457

(51) Int. Cl.
*B62B 15/00*  (2020.01)
*B62B 5/00*  (2006.01)

(52) U.S. Cl.
CPC .......... *B62B 15/009* (2013.01); *B62B 5/0086* (2013.01)

(58) Field of Classification Search
CPC ..... B62B 15/008; B62B 15/009; B62B 13/18; B62B 5/0086; B62B 2301/05; B62B 2205/104; B62B 5/0083; A63C 2005/063; B60F 5/00
See application file for complete search history.

(56) References Cited

U.S. PATENT DOCUMENTS

| | | | | |
|---|---|---|---|---|
| 487,990 | A * | 12/1892 | Chittick | B62B 13/18 280/8 |
| 641,113 | A * | 1/1900 | Ingells | B62B 13/18 280/11 |
| 1,238,333 | A * | 8/1917 | Ratner | B62B 13/18 280/9 |
| 1,607,283 | A * | 11/1926 | Korn | B62B 13/18 280/11 |
| 3,477,734 | A | 11/1969 | Albertson | |
| 3,552,515 | A | 1/1971 | Tomita | |
| 3,580,592 | A * | 5/1971 | Schrecengost | A47C 17/64 280/8 |
| 4,046,392 | A | 9/1977 | Dredger et al. | |
| 5,265,892 | A * | 11/1993 | Said | B62B 19/02 280/30 |
| 7,114,730 | B2 * | 10/2006 | Cheldin | B62B 5/0026 280/47.24 |
| 7,150,465 | B2 * | 12/2006 | Darling, III | A61G 1/013 280/640 |

(Continued)

FOREIGN PATENT DOCUMENTS

CA  873771 A  6/1971
CA  909296 A  9/1972
(Continued)

*Primary Examiner* — Steve Clemmons
(74) *Attorney, Agent, or Firm* — Laine IP Oy

(57) ABSTRACT

It is herein presented a novel transfer apparatus for a snowmobile, the transfer apparatus comprising a joint part and a support for a wheel. The joint part comprises an attachment hole for a ski bolt between a ski and a ski suspension of the snowmobile and a first coupling member for the detachable attachment of the support for the wheel and the support for the wheel comprises a second coupling member which is configured to connect to the first coupling member such that a detachable coupling is formed for the wheel.

11 Claims, 4 Drawing Sheets

(56) References Cited

U.S. PATENT DOCUMENTS

| | | | |
|---|---|---|---|
| 10,059,362 B1 * | 8/2018 | Robillard | B62B 17/02 |
| 2004/0232634 A1 * | 11/2004 | Blackmon | B62B 5/0083 |
| | | | 280/47.26 |
| 2006/0090939 A1 * | 5/2006 | White | B60S 13/00 |
| | | | 180/9.26 |
| 2010/0133769 A1 * | 6/2010 | Wu | B60B 3/001 |
| | | | 280/47.18 |
| 2015/0210133 A1 | 7/2015 | Lacombe | |
| 2017/0274919 A1 | 9/2017 | Somerset et al. | |

FOREIGN PATENT DOCUMENTS

| | | | | |
|---|---|---|---|---|
| CA | 2256846 A1 | 6/2000 | | |
| CA | 2250393 A | 10/2000 | | |
| CA | 2647375 A1 * | 6/2010 | | F16H 21/44 |
| GB | 2495854 A | 4/2013 | | |

* cited by examiner

TRANSFER APPARATUS FOR A SNOWMOBILE

FIELD OF TECHNOLOGY

The present invention relates to devices that move in the snow. In particular the invention relates to vehicles equipped with steering skis and tracks, such as snowmobiles. More precisely the invention relates to a transfer apparatus for a snowmobile according to the preamble of claim 1.

BACKGROUND

A modern snowmobile features a drive track which propels the snowmobile and which transmits the power of the engine to the ground. In front of the track are steering skis which in part bear the load of the snowmobile and the cargo thereof and steer the snowmobile during riding. On normal riding surfaces, such as on snow, the skis glide on the surface. On dry terrain, asphalt, concrete, and comparable surfaces the skis do not slide and the maneuvering of the snowmobile is difficult. The skis also wear on surfaces that do not provide for sliding. The snowmobile must, however, be transported also on such surfaces in garages and other storage spaces as well as during loading and unloading of the snowmobile onto and off a trailer. Such transportation also occurs often in connection with servicing.

There are two different types of transfer apparatuses for transport. A transportation platform may be provided under the ski with small transportation rollers on the underside of the platform. The skis may be difficult to lift onto such a platform and the small rollers ride poorly on rough surfaces, on top of which the skis are prone to drop off the transportation platform. A second main type includes forks or carriages that are pushed underneath the skis with a bar to be placed underneath the ski and a wheeled rocking arm attached thereto. The bar is introduced underneath the ski and the skis are lifted onto the wheels by pressing the rocking arm. An associated problem is the introduction of the bar under the ski and the lack of attachment to the ski, whereby the device does not stay connected during transportation. There exists a version of such devices that has support surfaces to the sides and behind the ski, whereby the attachment of the device to the ski is more secure during transportation. A device called SKISAVER®Flex is installed with hooks underneath the ski and with a strap to the lifting loop at the tip of the ski. Installation of the device is difficult in the snow and the device is large, whereby it is difficult to bring along on the snowmobile. Transportation and riding of the snowmobile is thus possible only when the device is available from a service car or at the storage location of the snowmobile.

It is also possible to attach fixed wheels to the skis of the snowmobile that are turned below the under surface of the ski upon arrival to a dry surface and that are folded or fold automatically to an upper position for snow riding upon arrival to a snowy surface. Such a wheel solution does enable riding to a dry surface, such as at parking lots and yards of service stations, but due to the fixed installation off-road riding may be even dangerous because the wheel and its bracket are partly left outside the carrying surface of the ski. The solution is therefore not entirely suitable for off-road use because it risks tangling into obstacles in the terrain such as stomps, rocks, or ice. One manufacturer of such a wheel solution is ROUSKI KIMPEX™.

SUMMARY

It is an aim of the present solution to provide an ever improved device for the transportation of a snowmobile or a comparable off-road vehicle equipped with skis on a dry surface. The skis, particularly the steering skis, of the vehicle are intended to be lifted onto wheels, whereby the vehicle may be transported and steered with said wheels.

The invention is characterized by the definitions of the characterizing portions of the independent claims.

According to one aspect of the invention the transfer apparatus for a snowmobile comprises a joint part and a support for a wheel. The joint part comprises an attachment hole for a ski bolt between a ski and a ski suspension of the snowmobile and a first coupling member for the detachable attachment of the support for the wheel. The support for the wheel comprises a second coupling member which is configured to connect to the first coupling member such that a detachable coupling is formed for the wheel According to an embodiment the joint part is dimensioned such that the joint part does not extend past the outer edge of the ski when installed to the ski bolt.

According to an embodiment the attachment hole of the joint part and the first coupling member overlap or are aligned in a height dimension, when the joint part is installed to the ski bolt.

According to an embodiment the first coupling member comprises an opening.

According to an embodiment the first coupling member and second coupling member form a coupling which is a detachable quick coupling.

According to an embodiment the quick coupling comprises at least one ball plunger.

According to an embodiment the quick coupling comprises a bayonet connection.

According to an embodiment the quick coupling comprises a locking tongue.

According to an embodiment the first coupling member comprises an opening and the second coupling member is a mate pin which fits into said opening.

According to an embodiment the opening of the first coupling member comprises mating surfaces corresponding to the mate pin and at least one relief between the mating surfaces.

According to another aspect of the invention a joint piece for a transfer apparatus for a snowmobile comprises an attachment hole for a ski bolt between a ski and a ski suspension of the snowmobile and a first coupling member for the detachable attachment of a support for a wheel.

BRIEF DESCRIPTION OF THE DRAWINGS

In the following certain exemplary embodiments are described in greater detail with reference to the accompanying drawings, in which.

EMBODIMENTS

Definitions

In the present context the expression "snowmobile" refers to a vehicle that is configured to move in the snow with at least one typically a steering ski.

In simple terms the invention relates to auxiliary wheels intended for the transportation of a snowmobile to facilitate maneuvering the snowmobile on dry land, asphalt, and on comparable surfaces, on which the ski does not slide, and in situations where ski wear is to be prevented by avoiding riding on rough surfaces (e.g. maneuvering in a garage having a concrete floor). Such auxiliary wheels also facilitate loading onto transportation vehicles. Wheeled platforms introduced under the skis are the most commonly used auxiliary devices used for maneuvering snowmobiles. Also a few other different transportation platforms exist in the market. The most commonly used transportation platform does not work very well because the small wheels do not roll on uneven surfaces and the platforms are prone to escape easily from underneath. The snowmobile is also not steerable. In the present embodiments a separate mount is installed to the ski bolt of the snowmobile for an auxiliary wheel which, in turn, is preferably quick coupled to said fixedly installed mount. The fixedly installed mount provides for a sturdy and fast coupling for the transportation wheel. The transfer apparatus allows for using large wheels which enable transportation also on uneven surfaces. The wheels also turn with the skis, whereby the snowmobile is also steerable with the transportation wheels. With aid of the transfer apparatus the snowmobile may be maneuvered by pushing or riding at an appropriately slow and safe speed.

The contact of the snowmobile or comparable off-road vehicle to the ground is establised via a track and skis. The skis form part of the load-bearing and the majority of the steerability of the snowmobile. The skis have been fitted to the snowmobile through a suspension. The suspension comprises a damper, a spring, a joint, a control arm, and it may be seen as comprising the ski(s) itself/themselves. There are several different suspension types but in modern snowmobiles the skis typically attach to the suspension with a ski bolt which extends transversally to the longitudinal orientation of the ski.

Figure 1:
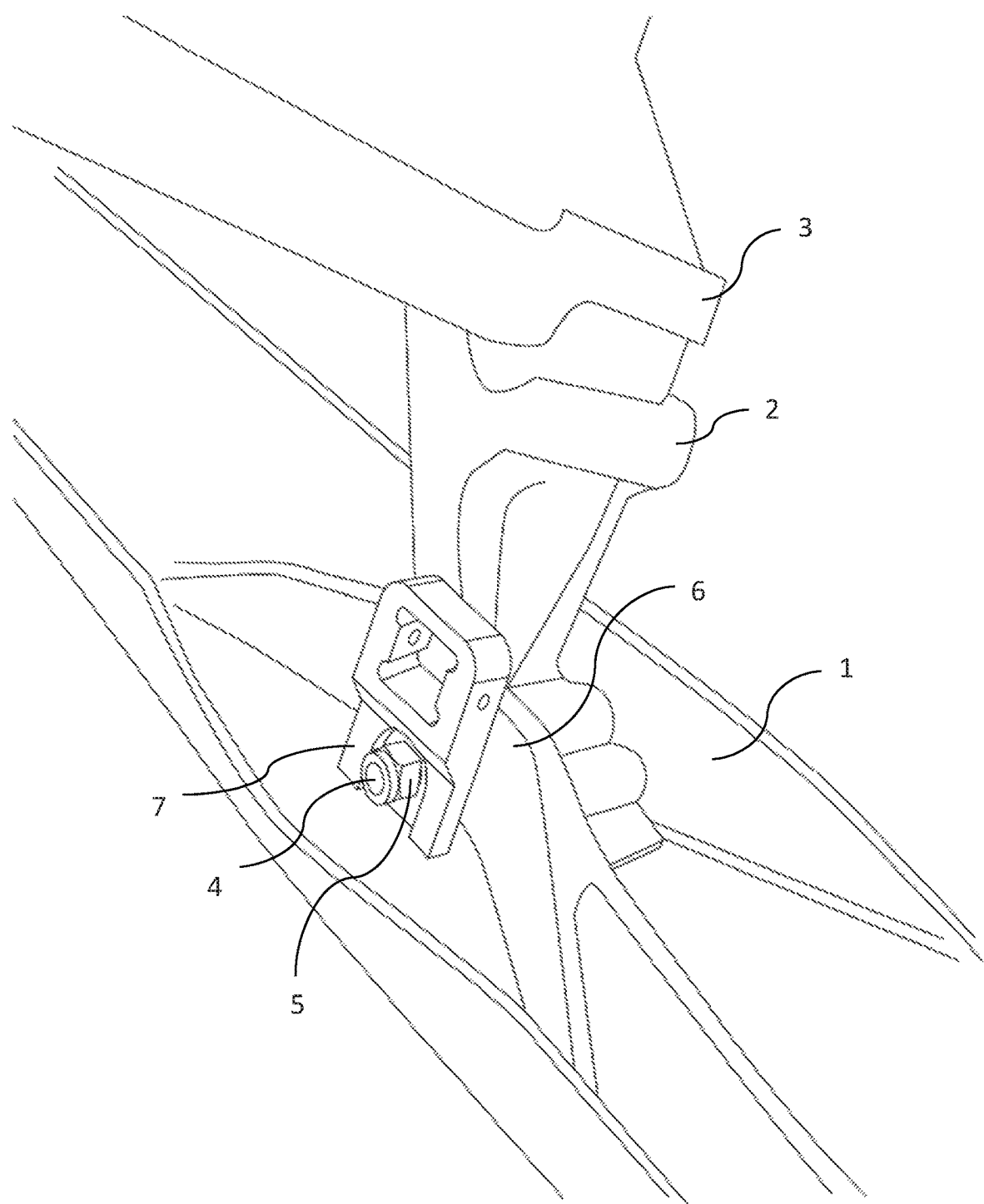
FIG. 1 illustrates a schematic perspective view of a suspension of a snowmobile ski and a coupling member according to at least one embodiment attached to the ski bolt of the snowmobile.
Figure 2:
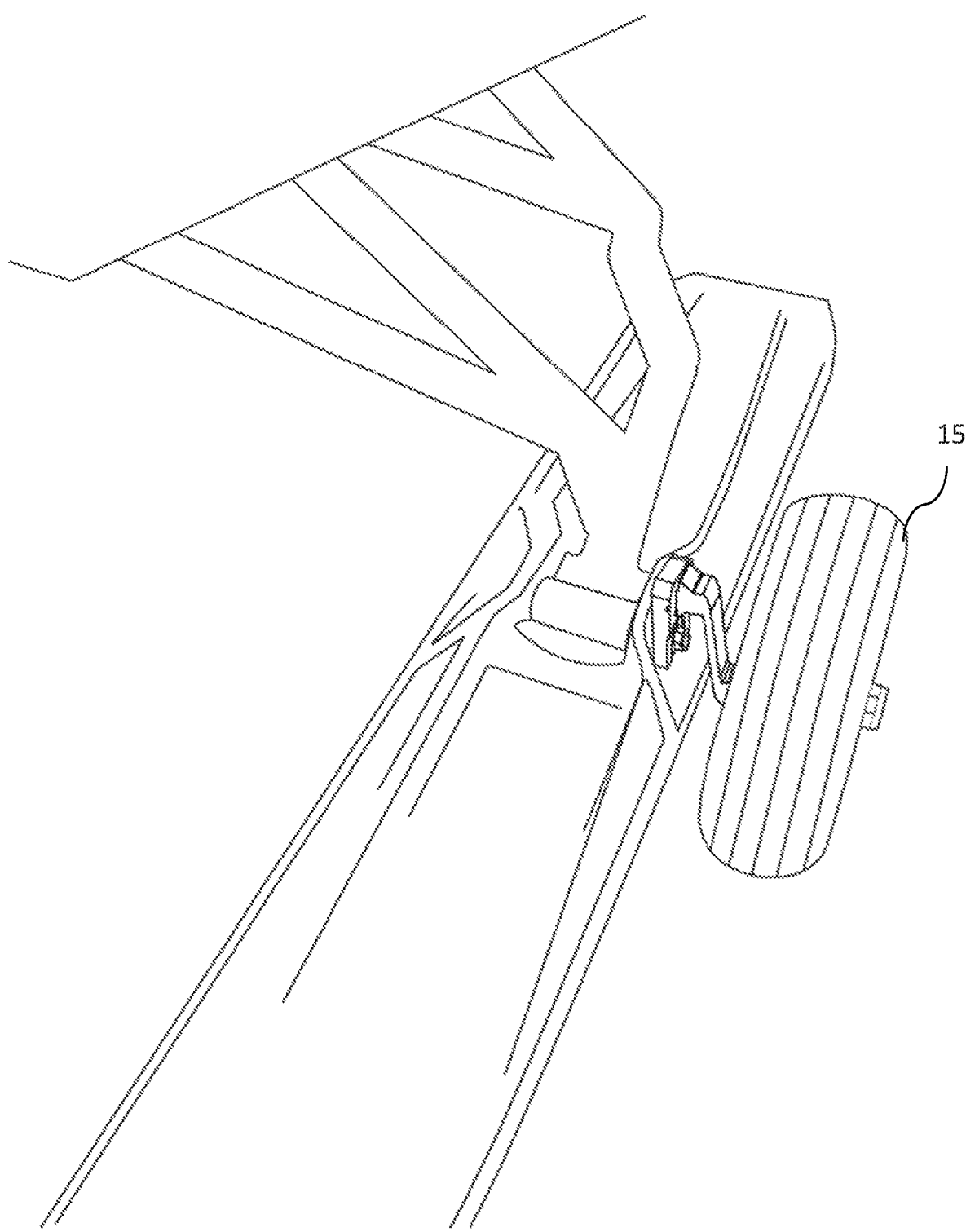
FIG. 2 illustrates a schematic view of a transfer apparatus for a snowmobile according to at least one embodiment with a wheel attached to the ski of the snowmobile.

FIG. 1 presents the suspension of a snowmobile in a schematic fashion. The example of FIG. 1 features a swivel pin 2 which attaches to the snowmobile through a control arm 3 and other suspension components. At the end of the swivel pin 2 there is a hole, which is transversal to the longitudinal dimension of the snowmobile, i.e. the travelling direction, for a ski bolt 4. The ski has brackets 6 that too comprise holes suitable for receiving the ski bolt. The end of the swivel pin 2 lies between the brackets 6 and the ski bolt 4 extending through the end of the swivel pin and the brackets affixes the ski 1 to the swivel pin 2. A nut 5 locks the ski bolt 4 in place. The ski bolt 4 extends transversally in respect to the longitudinal dimension of the ski 1. In this example the gap between the brackets 6 is narrower than the width of the ski 1. In some cases the brackets may be aligned with the long outer edges of the ski 1 and the attachment between the swivel pin 2 and the ski 1 may deviate slightly depending on the structure of the suspension. It is also possible that the ski 1 attaches to the suspension through other means than through a separate swivel pin 2, such as directly to the control arm. Conventionally there is always one ski bolt 4 transversal to the longitudinal dimension for attaching the ski to the suspension and to the snowmobile.

Figure 3:
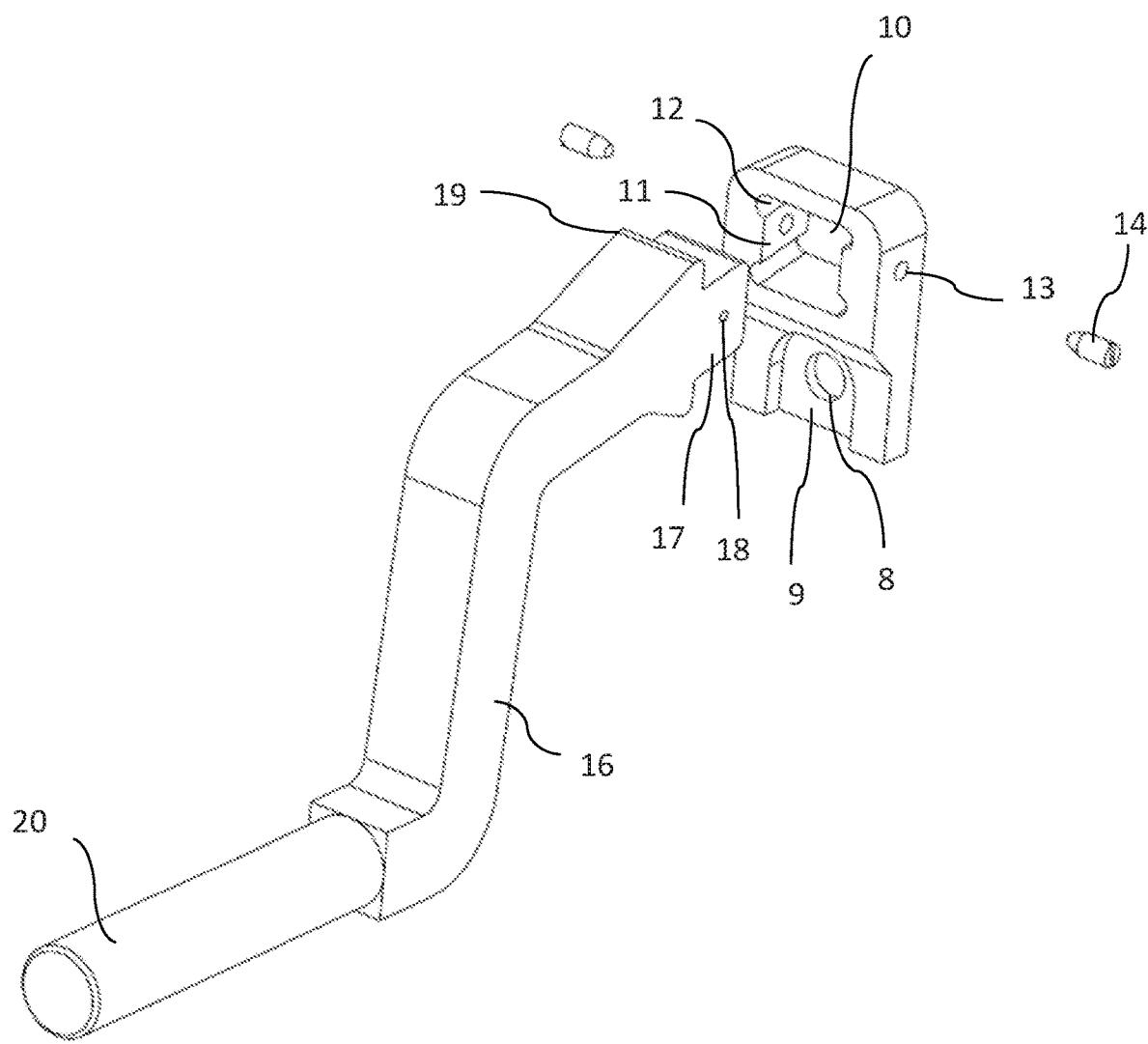
FIG. 3 illustrates an exploded view of one embodiment of the invention.
Figure 4:
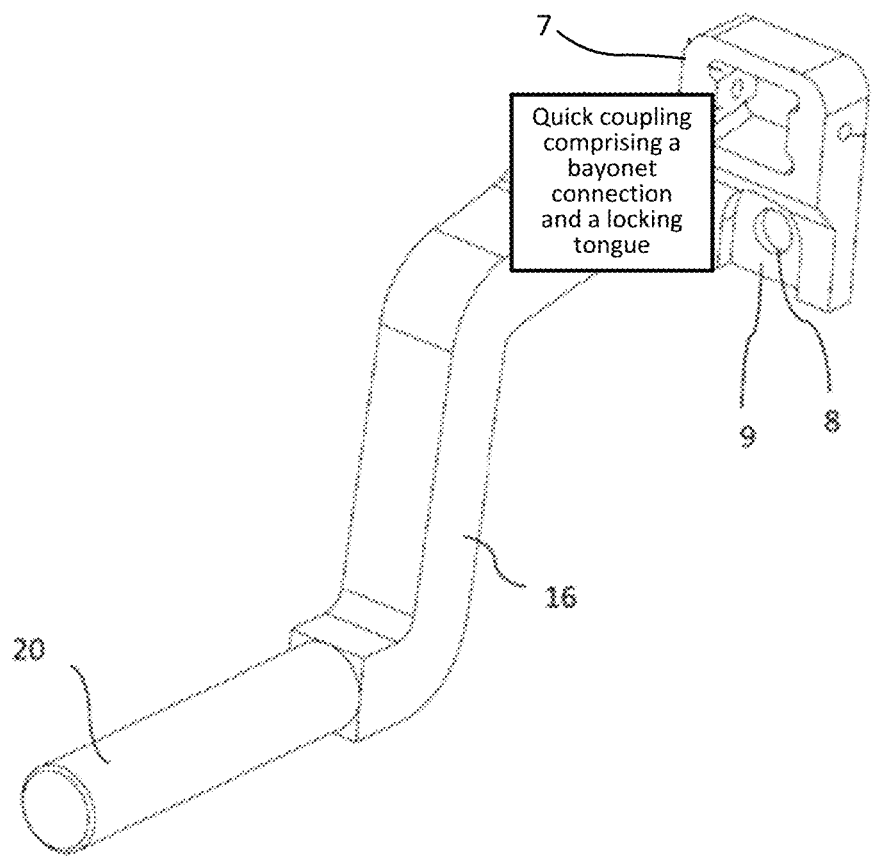
FIG. 4 illustrates an exploded view of one embodiment of the invention.

In FIG. 1 a joint part 7 is attached to the ski bolt 4 with a nut 5. The shape and construction of the joint part 7 transpires in greater detail from FIG. 3. The joint part 7 has a rectangular shape and at the first end thereof there is a hole 8 for the ski bolt 4. Around the hole 8 there is a recess that opens towards the first end of the joint part 7. When the joint part 7 is attached to the ski bolt 4, the end of the ski bolt 4 and the nut 5 are at least partly embedded into the recess 9 and covered by the edges thereof (FIG. 1). The distance between the hole 8 and the first end of the joint part 7 is dimensioned such that enough space is left between the joint part 7 and the upper surface of the ski 1 such that the ski 1 is able to move normally on the ski bolt. Thus the joint part 7 may be fixedly installed to the ski bolt 4. At an end of the joint part 7 opposite to the hole 8 there is a first coupling member. In this example the first coupling member has a general shape of a quadrangular opening 10. On the inner surfaces of the opening 10 there are straight mating surfaces 11 and reliefs 12 there between. The mating surfaces 11 are configured to engage a second coupling member which is to be introduced to the opening 10. The reliefs 12 on the other hand facilitate the installation of the second coupling member into the opening 10. When the snowmobile is ridden in the snow, the opening is easily filled with snow. The reliefs 12 promote ejection of snow from the opening 10, when the second coupling member is fitted into the opening 10. There are tapped holes 13 between the mating surfaces 11 that are adjacent to the long sides (the vertical sides of an installed joint part) of the joint part 7 with ball plungers 14 in said tapped holes 13. One end of the ball plungers feature a spring loaded ball which may be pressed in against the spring force along the longitudinal axis of the ball plunger 14. The joint part 7 is slightly thicker around the opening than at the end adjacent to the hole 8. A longer support surface is thus achieved for the support 16 for the wheel 15.

The attachment hole 8 for the ski bolt 4 and the opening 10 are parallel in the longitudinal direction of the joint part, i.e. superposed in a joint part which is installed to the ski bolt. Thus the dimensions of the joint part may be minimized in the dimension of the ski bolt. It may be foreseen that the joint part is installed in alignment with the longitudinal axis of the ski, i.e. horizontally, but then a rotating moment load is caused and the joint part should be locked to withstand such moment. In vertical installation only tensile loads are subjected to the joint part and possible twist around the ski bolt is automatically stabilized.

The wheel support 16 comprises at a first end a second coupling member which, in the present example, is a mate pin 17. The mate pin 17 protrudes from the end of the support 16 for the wheel 15 and it has a quadrangular cross-section. In principle, there are no limitations to the shape of the mate pin 17 and the opening 10, but it is meaningful to construct them as a cooperating pair, such as a lock and key. On the two opposing sides of the mate pin 17 there are recesses 18 for the balls of the ball plunger 14. The mate pin terminates to a shoulder 19. The shoulder 19 supports the wheel support 16 and receives its share of the weight of the snowmobile and loads originating from maneuvering. At and end of the support for the wheel 15 opposite to the mate pin 17 there is an axle 20 for the wheel 15. The axle 20 may be dimensioned for a standardized wheel hole. If desired, the axle may be fitted to wheels holes of different sizes with sleeves or comparable adapters. The support 16 for the wheel 15 is bent such that the center lines of the mate pin 17 and the axle 20 are spaced apart from one another. Thus the axle of the wheel is placed on a suitable height such that when the wheel 15 and the wheel support are installed to the joint part 7, the wheel extends enough underneath the under surface of the ski such that the ski is lifted above the ground. In this example the frame of the support 16 is a solitary bent piece but it may be shaped in a preferred fashion and consist of several fixedly or removably assembled pieces.

The joint piece 7 is fixed permanently to the ski bolt 4. The joint piece has small outer dimensions, whereby it does not add weight to the ski and is left within the projection of the ski 1 such that no part of it extends past the outer edges of the ski. The risk of entanglement with stumps, branches, and other obstacles is thus minimized. The joint piece may be attached on either side of the ski. The benefit of an outer attachment is a larger track during maneuvering, whereas the benefit of an inner attachment is that the outer dimensions of the snowmobile do not increase at the ski. This may be a considerably benefit when loading the snowmobile onto a transportation vehicle. As a dimensioning example the outer dimensions of the joint piece may be 60 by 40 by 15 mm.

Wheels of preferred shape and size may be used in connection with the transfer apparatus. The wheels may be supplied as part of a transfer apparatus kit or they may be provided separately. Thus the user may select wheels that are suitable for the particular need at hand.

The coupling between the wheel support 16 and the joint part 7 may be provided in several ways. It is, however, preferred that the coupling may be attached and detached relatively easily. For example, a threaded coupling or a bolt-and-nut connection are foreseen but relatively difficult to install. Instead of a closed opening, the first coupling member may be formed from a horizontal or vertical slot but an annular, peripherally closed opening has a stronger construction. The opening may in principle be a recess but then the clearing of snow may be difficult and make using the device more time consuming.

It is therefore preferable to employ a quick coupling in locking the joint part to the support 16 for the wheel 15. It may be provided according to the afore-mentioned fashion with ball plungers, the balls of which may easily revert as the mate pin is inserted into the opening 8 and lock into recesses 18. Coupling such formed is sufficient and susceptible for attachment and detachment without tools. Alternative locking solutions include bayonet connections, spring loaded or hand operated pins or tongues or ball locks used in hydraulic couplings.

INDUSTRIAL APPLICABILITY

The invention is suitable for transportation of various vehicles equipped with skis.

LIST OF REFERENCE NUMERALS

1 ski
2 swivel pin
3 control arm
4 ski bolt
5 nut
6 bracket
7 joint piece
8 hole
9 recess
10 opening
11 mating surface
12 relief
13 tapped hole
14 ball plunger
15 wheel
16 wheel support
17 mate pin
18 recess
19 shoulder

The invention claimed is:

1. A transfer apparatus for a snowmobile, the transfer apparatus comprising a joint part and a support for a wheel, wherein the joint part comprises:
   an through-hole, said through-hole adapted for a ski bolt between a ski and a ski suspension of the snowmobile to pass through the joint part, and
   a first coupling member for the detachable attachment of the support for the wheel comprising an opening;
and wherein
   the support for the wheel comprises: a second coupling member which is configured to connect to the first coupling member such so that a detachable coupling is formed for the wheel;
herein the through-hole hole of the joint part and the first coupling member overlap in a height dimension when the joint part is installed on the ski bolt.

2. The transfer apparatus for a snowmobile according to claim 1, wherein the transfer apparatus comprises a ski and wherein the joint part is dimensioned such that the joint part does not extend past the outer edge of the ski when installed to the ski bolt, said ski being attached to the ski bolt.

3. The transfer apparatus for a snowmobile according to claim 1, wherein the coupling comprises at least one ball plunger.

4. The transfer apparatus for a snowmobile according to claim 1, wherein the coupling comprises a bayonet connection.

5. The transfer apparatus for a snowmobile according to claim 1, wherein the coupling comprises a locking tongue.

6. The transfer apparatus for a snowmobile according to claim 1, wherein the second coupling member is a mate pin which fits into the opening of the first coupling member.

7. The transfer apparatus for a snowmobile according to claim 6, wherein the opening of the first coupling member comprises mating surfaces corresponding to the mate pin and at least one relief between the mating surfaces.

8. The transfer apparatus for a snowmobile according to claim 1, wherein the first coupling member and the through hole of the joint part are located side-by-side in the joint part.

9. The transfer apparatus for a snowmobile according to claim 1, wherein the through hole is located within a recess in the joint part.

10. The transfer apparatus for a snowmobile according to claim 1, wherein the opening of the first coupling member is formed in a surface which is offset along the socket axis from the surface the through-hole is comprised in.

11. A joint piece for a transfer apparatus for a snowmobile, wherein the joint piece comprises an through-hole, said through-hole adapted for a ski bolt between a ski and a ski suspension of the snowmobile to pass through the joint part and a first coupling member for the detachable attachment of a support for a wheel, wherein the first coupling member comprises an opening, and wherein the through hole of the joint part and the first coupling member overlap in a height dimension when the joint part is installed on the ski bolt.

* * * * *